(12) United States Patent
Spark (10) Patent No.: US 7,191,865 B2
(45) Date of Patent: Mar. 20, 2007

(54) OFF ROAD VEHICLE

(76) Inventor: Ian James Spark, 295 Lindhers/Dobbins Rd., Jeeralang Junction, Morwell (AU) 3840

( * ) Notice: Subject to any disclaimer, the term of this patent is extended or adjusted under 35 U.S.C. 154(b) by 0 days.

(21) Appl. No.: 10/405,072

(22) Filed: Apr. 2, 2003

(65) Prior Publication Data

US 2004/0195013 A1 Oct. 7, 2004

(51) Int. Cl.
*B62D 7/15* (2006.01)
*B62D 9/00* (2006.01)

(52) U.S. Cl. ........................ 180/411; 180/446; 180/6.5; 180/6.28

(58) Field of Classification Search ................ 180/6.2, 180/6.24, 6.26, 6.28, 6.3, 6.32, 6.4, 6.34, 180/233, 6.36, 234, 6.38, 236, 6.5, 252, 21–24, 180/24.06–24.08, 210–212, 400, 408, 409, 180/411, 446; 701/41
See application file for complete search history.

(56) References Cited

U.S. PATENT DOCUMENTS 4,237,994 A * 12/1980 McColl ...................... 180/179
5,014,802 A * 5/1991 Knoll et al. ................. 180/408
5,143,400 A * 9/1992 Miller et al. .............. 280/5.522
5,402,344 A * 3/1995 Reister et al. ................. 701/84

FOREIGN PATENT DOCUMENTS

WO      WO 98/19875      * 5/1998
WO      WO 00/32462      * 6/2000

* cited by examiner

*Primary Examiner*—Kevin Hurley (57) ABSTRACT

There are two basic methods of steering a wheeled vehicle. One method is to turn one or more steerable wheels. The other is to drive one or more left hand wheels independently of one or more right hand wheels. Traditional vehicles address the potential conflict between the two steering systems by either disabling one system or by causing one to overpower the other. This leads to skidding or scuffing problems respectively. In the present invention both steering systems are enabled but are integrated by means of an on board computer so that they always act in unison. This mutual reinforcement will allow the invention to operate safely on steep or slippery slopes while minimizing fuel consumption and ground damage. The invention will also be more maneuverable than traditional vehicles since it is capable of both pure rotation and pure translation or any combination of rotation and translation.

32 Claims, 5 Drawing Sheets

OFF ROAD VEHICLE

TECHNICAL FIELD

The invention relates to a means of increasing the tractability, stability, manoeuvrability and safety of wheeled vehicles while at the same time minimizing fuel consumption and damage to the ground traversed.

DESCRIPTION OF PRIOR ART

The following patents or patent applications allude to the problem to be solved by the present invention, but do not go far enough to describe a complete solution.

WO 98/19875 A1 (GRANT) 14 May 1998 merely states that the drive wheel speeds and angles are calculated by a computer.

WO 00/32462 A1 (Grant) 8 Jun. 2000 describes equations for drive wheel speeds and wheel angles. These equations are hard to decipher since the variables are poorly defined. The equations for wheel speeds are clearly different from those described in the present invention, and as such must be incorrect. Grant's equations for wheel speed may approximate to the correct equations when the radius of curvature of the path of the vehicle is large.

U.S. Pat. No. 4,237,994 A (MCCOLL) 9 Dec. 1980 refers to "desired" wheel speeds and "desired" wheel angles, but does not say what these are or how the are calculated.

PCT/AU95/00264 (SPARK) 6 May 1994 describes two wheel drive vehicles and four wheel drive vehicles where skidding and scuffing are substantially avoided. Here equations are given whereby the wheel angles are calculated from dimensions of the vehicle and the speeds of the left hand and right hand drive wheels—where the latter are selected by the driver by means of left hand and right hand steering levers.

There are two disadvantages of this means of driver control. Firstly there is only a limited range of wheel speed ratios for which scuffing can be avoided. Outside this range there are no wheel angles that can avoid scuffing. Secondly for any allowable wheel speed ratio, there are generally two sets of wheel angles, which will avoid scuffing. One set will involve a large radius of curvature for the path of the vehicle and small wheel angles, and the other vice versa.

Although the use of a steering wheel or rotatable joystick is foreshadowed, the control equations given are clumsy and inadequate in so far as they deduce the drive wheel speed ratio from the rotation of the steering wheel or joystick according to an empirical equation, and then deduce the wheel angles from the said drive wheel speed ratio. This means that the disadvantages, alluded to above, that are associated with the use of steering levers (with their unlimited range of drive wheel speed ratios) will still apply.

BACKGROUND

There are two basic methods of manoeuvring a wheeled vehicle. One method is to turn one or more steerable wheels. The other method is to drive one or more left hand wheels independently of one or more right hand wheels. In general these two steering systems will conflict with one another when each tries to achieve a different centre of curvature for the path of the vehicle. This conflict causes a braking effect, which results in fuel wastage, scuffing of the ground traversed and associated tyre wear.

The traditional method of avoiding conflict between the two basic steering systems is to disable one system so that it cannot conflict with the remaining system. For example in a traditional road vehicle, the steering effect of driving the drive wheels at the same speed is eliminated by incorporating a differential into the drive train to the driving wheels. Conversely in a zero turn radius vehicle which is steered by driving the left hand drive wheel independently of the right hand drive wheel, the steering effect of one or more non driven wheels is eliminated by rendering the latter free to turn to any angle. That is, they are turned into castors.

The Problems to be solved

Unfortunately, making one steering system compliant with the other leads to stability and traction problems when the vehicle is operated in difficult conditions. If the sideways, forwards or backwards force on the vehicle increases and/or the coefficient of friction between the tyres and the ground decreases, the system used to manoeuvre the vehicle will eventually fail. For example, the differential becomes the Achilles' Heel of the traditional tractor when working on steep terrain, and especially in slippery conditions. In this environment weight is transferred from the uphill drive wheel making it liable to spinning. Although the stability of the traditional tractor can be improved by the use of a limited slip differential or a lockable differential, it is somewhat illogical to provide a differential in the first instance along with a subsidiary system which either impedes its operation, or stops it altogether.

Similarly it can be seen that the Achilles' heel of the zero turn radius vehicle when traversing a sleep slope are the non driven castors. Because these castors cannot exert any sideways force on their end of the vehicle, the tendency for this end to swing down the hill can only be prevented by the two drive wheels applying opposing forces to the vehicle—even though they may be driven at the same speed. As the steepness of the slope traversed increases the uphill drive wheel eventually loses traction and the front of the vehicle swings down the hill. In short the grip of the drive wheels on the ground is exhausted by the drive wheels fighting against each other in providing the torque necessary to stop the castored end of the vehicle swinging down the hill.

A method of overcoming the problems of traction and stability is to allow both steering systems to operate, but to allow one steering system to dominate the other. In this case the stability and traction problems are reduced at the expense of the introduction of a scuffing problem on turning. For example the elimination of the differential from the rear axle of four wheeled motor bikes improves traction at the expense of introducing a scuffing problem.

A more extreme example of conflict between the two basic methods of manoeuvring a vehicle occurs in skid steer vehicles (both wheeled and tracked). In this case the dominant steering system is the independent drive to the right hand and left hand drive wheels or tracks. The second enabled but dominated steering system is the wheel or track angle which is usually fixed at zero degrees and tend to drive the vehicle straight ahead. The conflict between the two steering systems causes the vehicle to take a path which is a compromise between the paths that would be produced by each system alone. This method of manoeuvring causes extreme scuffing with associated ground damage, fuel wastage and tyre or track wear.

In traditional vehicles, rotation and translation are generally linked. Translation of the vehicle along a curved path usually involves rotation, and rotation of the vehicle always involves translation. As a consequence, rotation and translation in a confined space can be a problem. Vehicles steered by independently driving the left and right hand wheels have improved manoeuvrability since they can be made to rotate about their own centre. This is pure rotation (i.e. without translation). Manoeuvrability can be further increased by allowing translation in any direction without the need for rotation. This pure translation is sometimes referred to as crab steering.

The solution proposed

The essential feature of the present invention is that both basic systems of manoeuvring a vehicle are to be used in unison so that they both try to produce the same centre of curvature for the path of the vehicle. With both systems reinforcing each other it will be possible to effectively manoeuvre the vehicle in much more difficult conditions than if only one system was used with the other system either disabled or dominated. Furthermore any centre of curvature can be selected by the driver, which further improves the manoeuvrability of the present invention. This enables the invented vehicle to execute either pure rotation or pure translation or any combination of translation and rotation.

The preferred means of driver control of the four wheel steering/four wheel drive variant of the invention is by means of a rotatable joystick. This maximises the manoeuvrability of the vehicle by allowing independent translation and rotation of the vehicle. In this means of driver control, the direction of translation of the vehicle is determined by the direction of displacement of the joystick, whereas the rotation of the vehicle is determined by the degree of rotation of the joystick. The amount of displacement of the joystick determines the root mean square of the four wheel speeds. Pure translation occurs when the joystick is displaced but not rotated. Pure rotation occurs when the joystick is twisted as far as it will go.

Alternatively, two separate devices could be used for driver control. One joystick could be used to determine the radius of curvature of the path of the vehicle and the root mean square wheel speed, and the second joystick could be used to determine the direction of the centre of curvature.

Alternatively, a joystick, steering wheel, knob or lever could be used to determine the radius of curvature of the path of the vehicle, and a separate joystick could be used to determine the direction of the centre of curvature of the path of the vehicle and the root mean square wheel speed.

DRAWINGS

In order that the invention may be more clearly understood, several preferred embodiments thereof will now be described with reference to the accompanying drawings.

Although a four wheel steering/four wheel drive vehicle will be initially described, it will be shown later that two wheel steering/four wheel drive vehicles and two wheel steering/two wheel drive vehicles are special cases of the general case. It will also be shown that six wheel drive vehicles and eight wheel drive vehicles can easily be developed from the four wheel steering/four wheel drive vehicle.

THE PREFERRED EMBODIMENT

Figure 1:
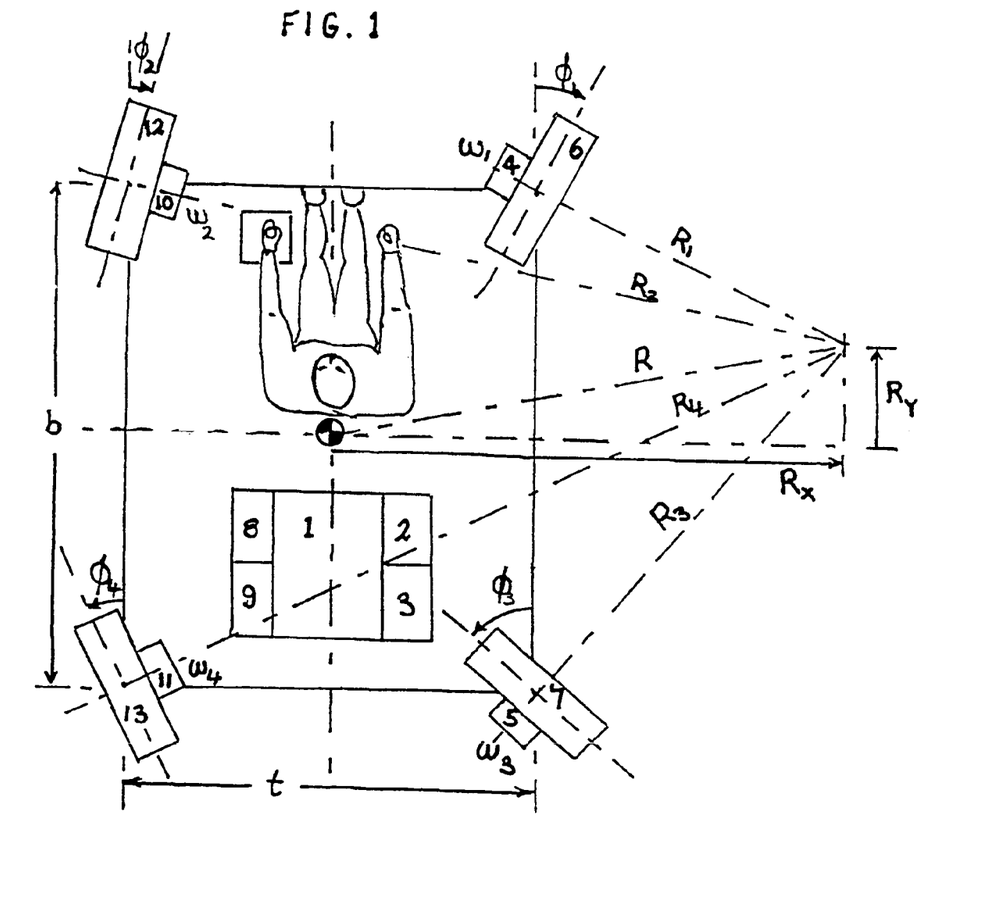
FIG. 1 is a plan view of the four wheel steering/four wheel drive variant of the invention.

In the four wheel steering/four wheel drive variant of the invention depicted in FIG. 1, an internal combustion engine 1 drive two right hand variable displacement hydraulic pumps 2 and 3 which in turn drive hydraulic motors 4 and 5 mounted in the steerable front and rear right hand wheels respectively. The internal combustion engine 1 also drives left hand variable displacement pumps 8 and 9 which in turn drive hydraulic motors 10 and 11 which are mounted in the steerable front and rear left hand wheels 12 and 13 respectively The angles of the wheels 6, 12, 7 and 13 are shown as $\phi_1$, $\phi_2$, $\phi_3$ and $\phi_4$ respectively. The rotational speed of the wheels 6, 12, 7 and 13 are $\omega_1$, $\omega_2$, $\omega_3$ and $\omega_4$ respectively.

The driver controls the vehicle by selecting the radius of curvature of the vehicle's path and the sense of rotation by rotating the joystick. If the joystick is not turned the radius of curvature of the path of the vehicle will be infinity and the vehicle will move in a straight line parallel to the direction of displacement of the joystick. If the joystick is twisted as far as it will go in a clockwise direction, the radius of curvature of the path of the vehicle will be zero and the vehicle will rotate clockwise about its own centre. Between these two extremes the radius of curvature of the path of the vehicle R is given by:

$$\frac{R}{t} = \cot(90° \ \theta/\theta_{\max}) = (R_X^2 + R_Y^2)^{1/2}/t$$

Where t is the track of the vehicle, $\theta$ is the rotation of the joystick and $\theta_{max}$ is the maximum rotation of the joystick.

If the driver displaces the rotatable joystick at an angle $\psi$ to the straight ahead position, the direction of the of curvature of the path of the vehicle will by at right angles to the direction of joystick displacement and $R_X$ and $R_Y$ will be given by the following equations:

$$R_X = R/(\tan^2\psi+1)^{1/2}$$

and $$R_Y = R \tan \psi/(\tan^2\psi+1)^{1/2}$$

The driver selects the direction of the centre of curvature by displacing the joystick at right angles to this direction. The centre of curvature of the path of the vehicle is now specified by the two components $R_X$ and $R_Y$. He selects the root mean square of the four wheel speeds by the amount of displacement of the joystick.

The control system then rotates the four drive wheels to the following angles:

$$\tan \phi_1 = (b/2 - R_Y)/(R_X - t/2)$$

$$\tan \phi_2 = (b/2 - R_Y)/(R_X + t/2)$$

$$\tan \phi_3 = (b/2 + R_Y)/(R_X - t/2)$$

$$\tan \phi_4 = (b/2 + R_Y)/(R_X + t/2)$$

Where b is the wheel base of the vehicle, $R_Y$ is the displacement of the centre of curvature forward of the centre of the vehicle and $R_X$ is the displacement of the centre of curvature to the right of the centre of the vehicle.

The amount of displacement of the joystick d determines the root mean square of the four wheel speeds (RMSWS) according to the equation:

$$RMSWS = Kd = (\omega_1^2 + \omega_2^2 + \omega_3^2 + \omega_4^2)^{1/2}/2$$

where K is an appropriate constant.

The individual wheel speeds are given by the equations:

$$\omega_1 = KdR_1/RMSR \text{ where } R_1^2 = (b/2 - R_Y)^2 + (R_X - t/2)^2$$

$$\omega_2 = KdR_2/RMSR \text{ where } R_2^2 = (b/2 - R_Y)^2 + (R_X + t/2)^2$$

$$\omega_3 = KdR_3/RMSR \text{ where } R_3^2 = (b/2 + R_Y)^2 + (R_X - t/2)^2$$

$$\omega_4 = KdR_4/RMSR \text{ where } R_4^2 = (b/2 + R_Y)^2 + (R_X + t/2)^2$$

And RMSR is the root mean square radius, which is given by:

$$RMSR = (R_1^2 + R_2^2 + R_3^2 + R_4^2)^{1/2}/2 = (R_X^2 + R_Y^2 + t^2/4 + b^2/4)^{1/2}$$

Note that when the rotation of the joystick $\theta$ is a maximum the radius of curvature will be zero and the direction of the displacement d of the joystick will be immaterial. It will be natural for the driver to push the joystick forward in this case to commence rotation.

If the above equations for wheel angles and wheel speeds are satisfied then the two basic methods of steering the vehicle will reinforce each other. Such a vehicle would combine the traction and stability of skid steer vehicles with the non scuffing advantages of traditional road vehicles. However the vehicle described above has much greater manoeuvrability since it is capable of both pure rotation and pure translation (in any direction).

A disadvantage of the variant of the invention described above is that four independent steering systems and four independent drive systems are required. It will be shown below that under special conditions the number of systems required can be reduced.

If $R_Y = 0$ the eight general control equations become:

$$\tan \phi_1 = (b/2)/(R_X - t/2)$$

$$\tan \phi_2 = (b/2)/(R_X + t/2)$$

$$\tan \phi_3 = (b/2)/(R_X - t/2) = \tan \phi_1$$

$$\tan \phi_4 = (b/2)/(R_X + t/2) = \tan \phi_2$$

and $\omega_1 = KdR_1/RMSR$ where $R_1^2 = b^2/4 + (R_X - t/2)^2$ $$\omega_2 = KdR_2/RMSR \text{ where } R_2^2 = b^2/4 + (R_X + t/2)^2$$

$$\omega_3 = KdR_3/RMSR \text{ where } R_3^2 = b^2/4 + (R_X - t/2)^2 = R_1^2$$

$$\omega_4 = KdR_4/RMSR \text{ where } R_4^2 = b^2/4 + (R_X + t/2)^2 = R_2^2$$

Where $RMSR = (R_X^2 + b^2/4 + t^2/4)^{1/2}$

In this case only two wheel angle control systems are required since $\phi_1 = \phi_3$ and $\phi_2 = \phi_4$.

Similarly only two wheel speed control systems are required since $\omega_1 = \omega_3$ and $\omega_2 = \omega_4$.

In this case the rotatable joystick only needs to rotate and move forward and backwards in a single plane. In this case the rotatable joystick can be replaced with a normal joystick where the forward displacement d determines the root mean square wheel speed and the lateral displacement determines the radius of curvature of the path of the vehicle where moving the joystick as far as it will go to the right will reduce the radius of curvature to zero and the vehicle will rotate about its own centre in a clockwise direction.

FIG. 2 shows the relationship between the position of the rotatable joystick (enlarged) and the wheel angles and wheel speeds for a four wheel steering/four wheel drive variant of the invention.

Figure 2A:
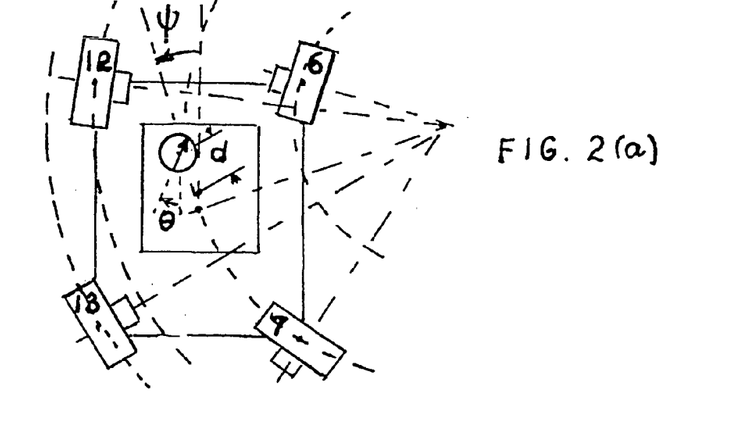
FIG. 2 shows the relationship between the position of the rotatable joystick, and the path of the vehicle. The figure is schematic in as much as the rotatable joystick is enlarged for the sake of clarity.

FIG. 2(a) shows the general case where the vehicle rotates about a point not located on either axis of the vehicle. In this case the four wheel angles are different and the four wheel speeds are different.

Figure 2B:
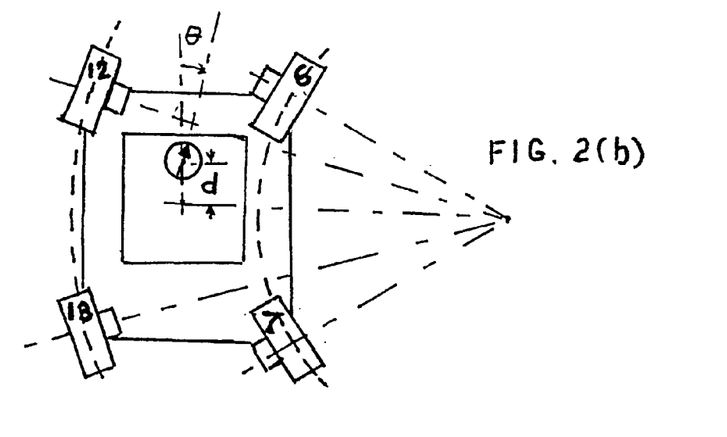

FIG. 2(b) depicts the vehicle when $R_Y = 0$. In this case $\phi_1 = \phi_3$, $\phi_2 = \phi_4$, $\omega_1 = \omega_3$ and $\omega_2 = \omega_4$.

Figure 2C:
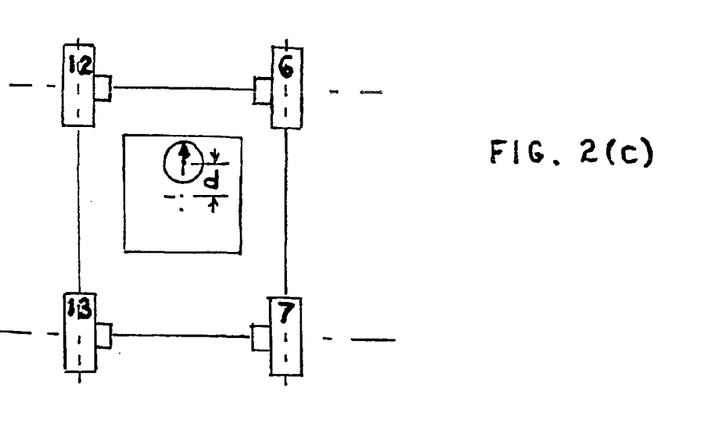

FIG. 2(c) depicts the vehicle when it moves straight ahead. In this case all the wheel angles are zero and all the wheel speeds are the same.

Figure 2D:
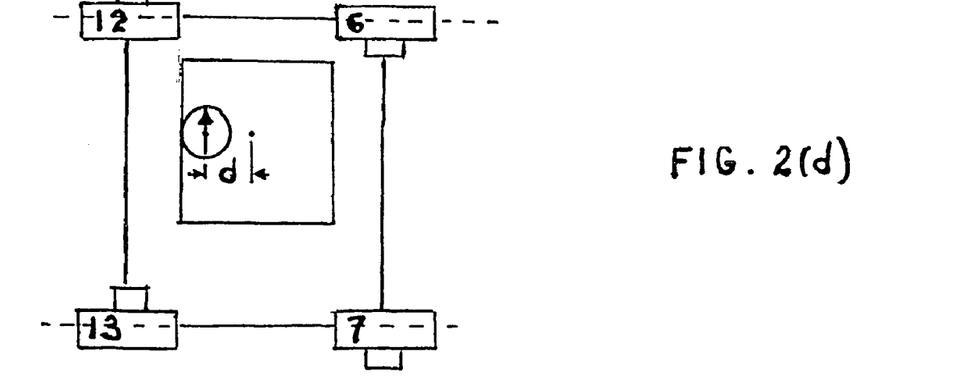

FIG. 2(d) depicts the vehicle when it moves straight to the left. In this case $\phi_1$ and $\phi_2$ are $-90°$ and $\phi_3$ and $\phi_4$ are $+90°$ and all the wheel speeds are the same.

Figure 2E:
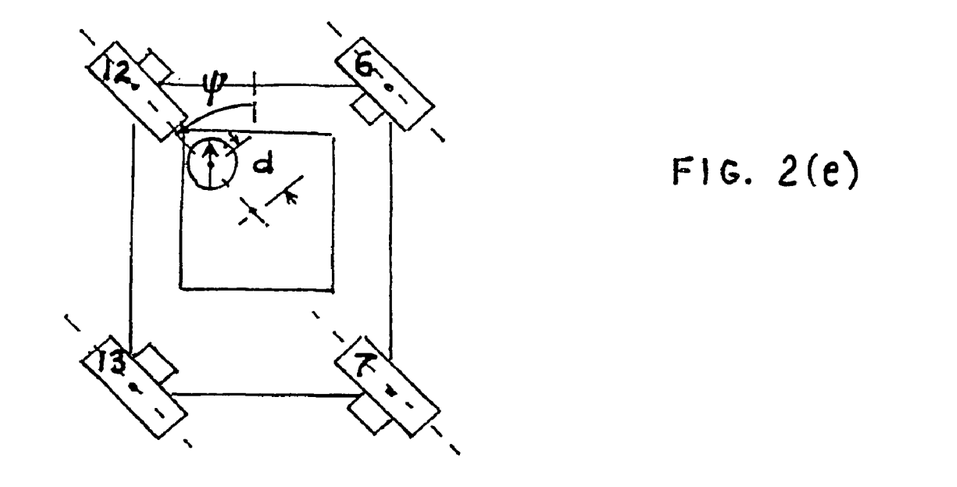

FIG. 2(e) depicts the vehicle when it moves in a diagonal direction. In this case $\phi_1$ and $\phi_2$ are $-45°$ and $\phi_3$ and $\phi_4$ are $+45°$ and all wheel speeds are equal.

Figure 2F:
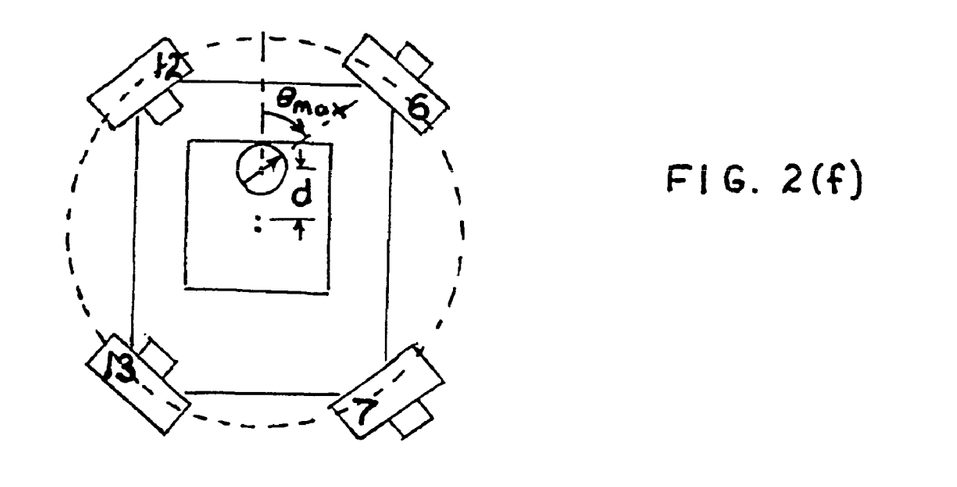

FIG. 2(f) depicts the vehicle when it executes pure rotation in a clockwise direction. In this case if $b = t$, $\phi_1$ and $\phi_3$ are $-135°$ and $\phi_2$ and $\phi_4$ are $+45°$.

If $R_Y = -b/2$ then the eight control equations become:

$$\tan \phi_1 = b/(R_X - t/2)$$

$$\tan \phi_2 = b/(R_X + t/2)$$

$$\tan \phi_3 = \tan \phi_4 = 0$$

$$\omega_1 = KdR_1/RMSR \text{ where } R_1^2 = b^2 + (R_X - t/2)^2$$

$$\omega_2 = KdR_2/RMSR \text{ where } R_2^2 = b^2 + (R_X + t/2)^2$$

$$\omega_3 = KdR_3/RMSR \text{ where } R_3^2 = (R_X - t/2)^2$$

$$\omega_4 = KdR_4/RMSR \text{ where } R_4^2 = (R_X + t/2)^2$$

where $RMSR = (R_X^2 + b^2/2 + t^2/4)^{1/2}$

Figure 3A:
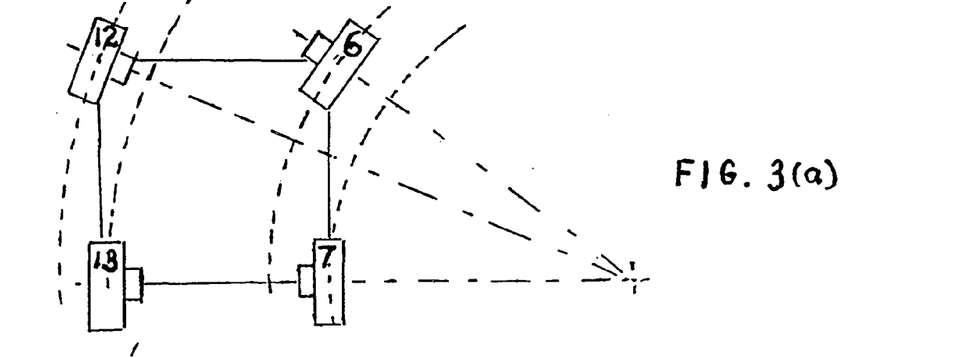
FIG. 3 shows how two wheel steering/four wheel drive, two wheel steering/two wheel drive, four wheel steering/six wheel drive and eight wheel steering/eight wheel drive vehicles can be developed from the four wheel steering/four wheel drive variant of the invention.
Figure 3B:
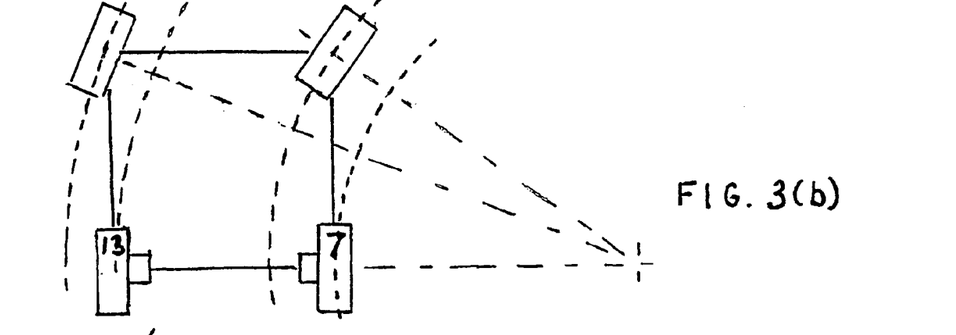
Figure 3C:
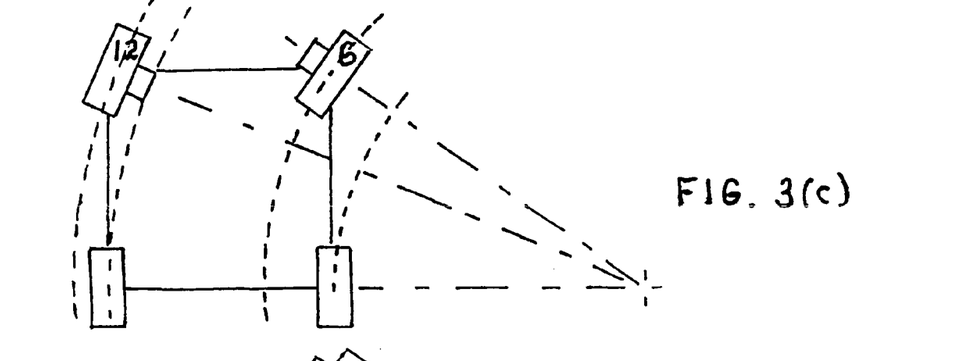

In this case no steering system is required for the rear wheels since $\phi_3$ and $\phi_4$ are zero. See FIG. 3(a). The vehicle is further simplified if either the front or rear wheels are undriven (that is are free wheels) so that only two speed control systems are required. See FIGS. 3(b) and 3(c).

Although the same equations apply to the two wheel steering/two wheel drive vehicle as apply to the two wheel steering/four wheel drive vehicle, there is no control imposed on the speed of the free wheels. In this case the speed of these free wheels could be ignored for the purpose of calculating the root mean square wheel speed. If the front wheels are free wheels the RMSR for the rear driving wheels is:

$$RMSR = (R_X^2 + t^2/4)^{1/2} \text{ See FIG. 3}(b).$$

If the rear wheels are free wheels the RMSR for the front driven wheels is given by:

$$RMSR = (R_X^2 + b^2 + t^2/4)^{1/2} \text{ See FIG. 3}(c).$$

Figure 3D:
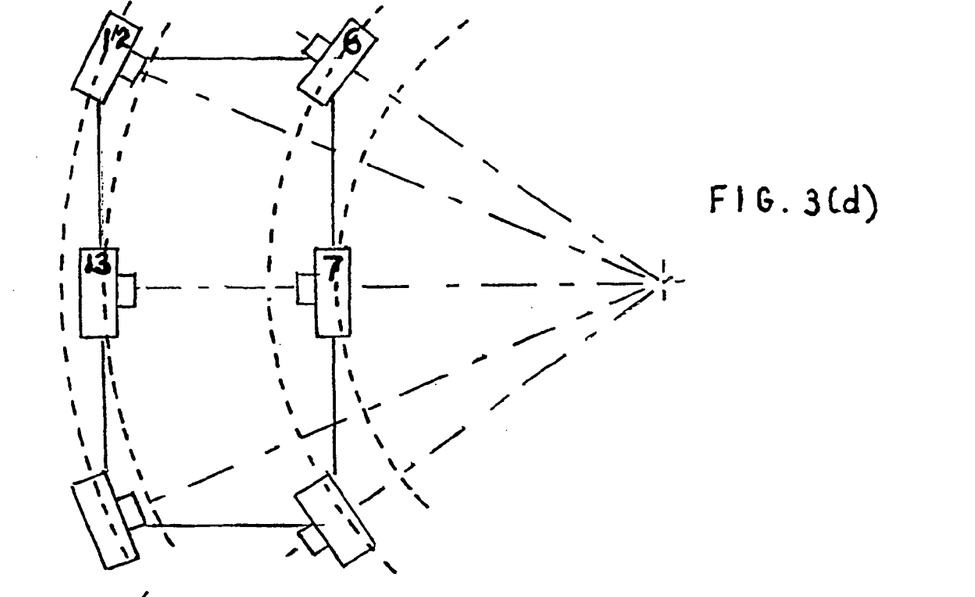

A six wheel variant of the invention can be constructed by making $R_Y = -b/2$, and then making a mirror image of the front wheels at the rear. See FIG. 3(d). In this case the wheels in the centre are unsteered. Since the front and rear wheels turn the same amount, only two wheel angle control systems are required. Furthermore since the front and rear wheels need to rotate at the same speed, only four speed control systems are required.

Figure 3E:
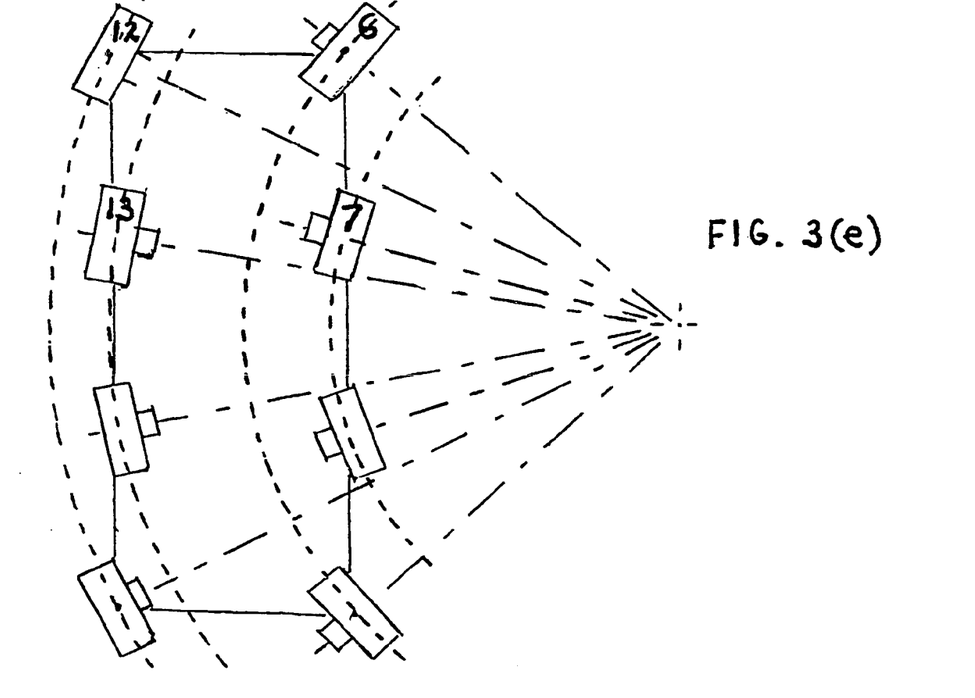

FIG. 3(e) shows an eight wheel variant of the invention. This is constructed by making $R_Y$ less than −b/2 (say−b) and making a mirror image of all four wheel at the rear. In this case all eight wheels are steered. Due to symmetry, only four wheel speed controls are required. Similarly only four wheel angle control systems are required.

The system used to control the wheel angles may work as follows:

The angle of a particular wheel will be measured. An on board computer will calculate (or approximate from a look up table) the correct angle from the driver's inputs of θ and ψ. If an error exists between the actual angle and the desired angle an actuator will be energised so as to eliminate this error. The on board computer will adjust the angles of all the other steerable wheels before repeating the cycle.

A similar system will be used to control the wheel speeds. The wheel speed of a particular wheel will be measured. The on board computer will calculate (or approximate from a look up table) the correct wheel speed from the driver's inputs of θ, ψ and d (the latter determining the root mean square wheel speed). If an error exists between the actual speed and the desired speed the drive to the wheel be adjusted so as to eliminate the error. The on board computer will adjust the speed of all other wheel speeds before repeating the cycle.

In large vehicles the actuators used to turn the wheels could be rotary hydraulic actuators. Alternatively double acting cylinders connected to rack and pinions could be used. In this case the engine 1 would also drive an auxiliary hydraulic pump (not shown in FIG. 1) which would drive the actuators via control valves activated by the on board computer.

In large vehicles the wheels could be driven by in built hydraulic motors which are powered by variable displacement hydraulic pumps. These pumps are driven by an internal combustion engine, which is governed to run at a constant speed. The speed of the wheels is controlled by varying the displacement of the pumps from a maximum flow in one direction to zero to maximum flow in the reverse direction. This allows the speed of the wheels to be varied from maximum forward to zero to maximum in reverse. The on board computer is used to alter the displacement of the pumps to produce the desired wheel speeds.

In smaller vehicles, the wheels could be conveniently driven by electric motors. Similarly the wheels could be turned by electrically powered actuators. Storage batteries could be used to power the motors and the actuators. The motors and actuators would be controlled by an on board computer as indicated above.

Alternatively, the wheels could be driven by an internal combustion engine, via variable ratio friction drives. The wheels could be conveniently turned by electric actuators. The friction drives and actuators would be controlled with the aid of an on board computer.

In an on road variant of the invention, higher wheel speeds and smaller wheel angles are required. In this case the wheel angles could be set by a steering wheel. The on board computer would positively control the wheel speeds to match the wheel angles selected. In this case the drive wheels would be driven mechanically by an internal combustion engine via a gear box and one or more traditional differentials where the wheel speeds are positively controlled by means of one or more steering differentials working in parallel with the one or more of the traditional differentials, where the speed of the electrically or hydraulically driven steering differentials are controlled by the on board computer.

The invention claimed is:

1. A vehicle having three or more wheels of substantially the same diameter, wherein:

each wheel is independently driveable at a specific rotational velocity about its own wheel axis and independently turnable about a substantially vertical axis to a specific steering angle relative to a longitudinal axis of said vehicle;

said vehicle includes a first joystick pivotable by a user from a neutral position in any direction relative to said longitudinal axis so as to provide a first demand signal for movement of said vehicle in a path that is instantaneously aligned with said direction; and said vehicle includes a further control means operable by said user to provide a second demand signal specifying a radius of curvature of said path, and wherein said vehicle includes a control system that adjusts both the rotational velocity and the steering angle of each wheel so as to execute travel of said vehicle along said path in response to said first and second demand signals.

2. A vehicle according to claim 1 including four rectangularly arranged wheels, wherein said further control means comprises a part of said first joystick that is rotatable by said user about a longitudinal axis of said joystick from a neutral angular position to provide said second demand signal, and wherein said control system adjusts the rotational velocity and steering angle of each said wheel according to the following equations:

$$R/t = \cot(90°\theta/\theta_{max}) = (R_X^2 + R_Y^2)^{1/2}/t;$$

$$\tan \psi = R_y/R_X;$$

$$R_Y = R/(\tan^2\psi + 1)^{1/2};$$

$$R_X = R \tan\psi/(\tan^2\psi + 1)^{1/2};$$

$$\tan \phi_1 = (b/2 - R_Y)/(R_X - t/2);$$

$$\tan \phi_2 = (b/2 - R_Y)/(R_X + t/2);$$

$$\tan \phi_3 = (b/2 + R_Y)/(R_X - t/2);$$

$$\tan \phi_4 = (b/2 + R_Y)/(R_X + t/2);$$

$$\omega_1 = KdR_1/RMSR \text{ where } R_1^2 = (b/2 - R_Y)^2 + (R_X - t/2)^2;$$

$$\omega_2 = KdR_2/RMSR \text{ where } R_2^2 = (b/2 - R_Y)^2 + (R_X + t/2)^2;$$

$$\omega_3 = KdR_3/RMSR \text{ where } R_3^2 = (b/2 + R_Y)^2 + (R_X - t/2)^2;$$

$$\omega_4 = KdR_4/RMSR \text{ where } R_4^2 = (b/2 + R_Y)^2 + (R_X + t/2)^2;$$

where RMSR is the root mean square radius which is given by the equation:

$$RMSR = (R_1^2 + R_2^2 + R_3^2 + R_4^2)^{1/2}/2 = (R_X^2 + R_Y^2 + t^2/4 + b^2/4)^{1/2};$$

and RMSWS is the root mean square wheel speed which is given by the equation:

$$RMSWS = Kd = (\omega_1^2 + \omega_2^2 + \omega_3^2 + \omega_4^2)^{1/2}/2;$$

where $\omega_1$ and $\theta_1$ are the rotational velocity and the steering angle (clockwise positive) of the front right hand wheel respectively $\omega_2$ and $\phi_2$ are the rotational velocity and the steering angle (clockwise positive) of the front left hand wheel respectively $\omega_3$ and $\phi_2$ are the rotational velocity and the steering angle (clockwise positive) of the rear right hand wheel respectively $\omega_4$ and $\phi_4$ are the rotational velocity and the steering angle (clockwise positive) of the rear left hand wheel respectively R is the radius of curvature of the path of the vehicle $R_X$ is the distance of the centre of curvature of the path of the vehicle to the right of the vehicle centre $R_Y$ is the distance of the centre of curvature of the path of the vehicle forward of the vehicle centre b is the wheel base of the vehicle t is the track of the vehicle $R_1$, $R_2$, $R_3$ and $R_4$ are the distances of the front right hand wheel, the front left hand wheel, the rear right hand wheel and the rear left hand wheel respectively from the centre of curvature of the path of the vehicle d is the displacement of the first joy stick, where the centre of curvature of the path of the vehicle is at right angles to the direction of displacement of the first joystick $\psi$ is the angle of displacement of the joystick to the left of the straight ahead position K is a suitable constant $\theta$ is the angle of rotation of the first joystick, and $\theta_{max}$ is the maximum angle of rotation of the first joystick.

3. A vehicle according to claim 1 having four wheels and wherein said further control means includes a wheel, lever, knob or second joystick.

4. A vehicle according to claim 3 wherein to each displacement of the joystick providing the first demand signal there corresponds a set value of the square root of the sum of the squares of the wheel velocities.

5. A vehicle according to claim 4 wherein said set value of the square root of the sum of the squares of the wheel velocities is proportional to the angular displacement of the joystick providing the first demand signal from its neutral position.

6. A vehicle according to claim 1 having four wheels arranged in a rectangle wherein the centre of curvature of the path of the vehicle always lies on a line extending transversely of the vehicle and midway between the front wheels and the rear wheels.

7. A vehicle according to claim 2 wherein $R_Y=0$ so that the centre of curvature of the path of the vehicle always lies on the transverse axis of the vehicle.

8. A vehicle according to claim 1 having four wheels arranged in a rectangle wherein the centre of curvature of the path of the vehicle always lies on a line extending transversely of the vehicle through either the front wheels or the rear wheels.

9. A vehicle according to claim 1 wherein $R_Y=+/-b/2$ so that the centre of curvature of the path of the vehicle always lies on a line extending transversely of the vehicle through either the front wheels or the rear wheels.

10. A six wheeled vehicle including an original vehicle according to claim 1 and including a pair of extra wheels at the rear of the original vehicle, said pair of extra wheels being positioned to be a mirror image of the original front wheels relative to a transverse vertical plane passing through the centres of the original rear wheels, wherein for the original vehicle $R_Y=-b/2$, wherein the steering angles of each extra wheel is controlled to be equal in magnitude and opposite in sign to the steering angle of its mirror image original wheel and wherein the speed and direction of rotation of each extra wheel is controlled to be the same as that of its mirror image original wheel.

11. An eight wheeled vehicle including an original vehicle according to claim 1 and including two pairs of extra wheels at the rear of the original vehicle, said pairs of extra wheels being positioned to be a mirror image of the original four wheels relative to a transverse vertical plane positioned a distance b/2 behind the original rear wheels, wherein for the original vehicle $R_Y=-b$, and wherein the steering angle of each extra wheel is controlled to be equal in magnitude and opposite in sign to the steering angle of its mirror image original wheel and the rotational speed and direction of rotation of each extra wheel is controlled to be the same as the rotational speed and rotational direction of its mirror image wheel.

12. An eight wheeled vehicle including an original vehicle according to claim 1 and including two pairs of extra wheels at the rear of the original vehicle, said pairs of extra wheels being positioned to be a mirror image of the original four wheels relative to a transverse vertical plane positioned a distance B−(b/2) behind the original rear wheels, wherein for the original vehicle $R_Y=-B$, B being a value greater than the sum of b/2 and the radius of the wheels of the original vehicle, and wherein the steering angle of each extra wheel is controlled to be equal in magnitude and opposite in sign to the steering angle of its mirror image original wheel and the rotational speed and direction of rotation of each extra wheel is controlled to be the same as the rotational speed and rotational direction of its mirror image wheel.

13. A vehicle according to claim 1 wherein each wheel is steerable within a steering angle range of +/−45 degrees and the speed of driven said wheels is controlled by one or more conventional differentials which are connected in parallel to one or more steering differentials that are driven by computer-controlled hydraulic or electric motors.

14. A vehicle having three or more wheels of substantially the same diameter, at least two of which are driven, where each driven wheel is independently and positively driven at one particular angular velocity about the axis of the wheel so as to produce a single centre of curvature for the path of the vehicle, and where each wheel is turned about a substantially vertical axis to a particular angle relative to the longitudinal axis of the vehicle so as to produce a single driver-selected centre of curvature, where a control system is used to adjust the speeds of the driven wheels and the angles of all the wheels so that the first centre of curvature is made identical to the second driver-selected centre of curvature.

15. A vehicle having four wheels of substantially the same diameter, at least two of which are driven, where each driven wheel is independently and positively driven at one particular angular velocity about the axis of the wheel so as to produce a single centre of curvature for the path of the vehicle, and where each wheel is turned about a substantially vertical axis to a particular angle relative to the longitudinal axis of the vehicle so as to produce a single driver-selected centre of curvature, where a control system is used to adjust the speeds of the driven wheels and the angles of all the wheels so that the first centre of curvature is made identical to the second driver-selected centre of curvature, where the driver selects the centre of curvature of the path of the vehicle, the sense of rotation and the root mean square wheel speed by means of a rotatable joystick and the said control system adjusts the speed and angle of each wheel according to the following equations:

$$R/t=\cot(90°\theta/\theta_{max})=(R_X^2+R_Y^2)^{1/2}/t;$$

$$\tan\psi=R_Y/R_X;$$

$$R_Y=R/(\tan^2\psi+1)^{1/2};$$

$R_X = R \tan \psi / (\tan^2 \psi + 1)^{1/2};$ $\tan \phi_1 = (b/2 - R_Y)/(R_X - t/2);$ $\tan \phi_2 = (b/2 - R_Y)/(R_X + t/2);$ $\tan \phi_3 = (b/2 + R_Y)/(R_X - t/2);$ $\tan \phi_4 = (b/2 + R_Y)/(R_X + t/2);$ $\omega_1 = KdR_1/RMSR$ where $R_1^2 = (b/2 - R_Y)^2 + (R_X - t/2)^2;$ $\omega_2 = KdR_2/RMSR$ where $R_2^2 = (b/2 - R_Y)^2 + (R_X + t/2)^2;$ $\omega_3 = KdR_3/RMSR$ where $R_3^2 = (b/2 + R_Y)^2 + (R_X - t/2)^2;$ $\omega_4 = KdR_4/RMSR$ where $R_4^2 = (b/2 + R_Y)^2 + (R_X + t/2)^2;$ where RMSR is the root mean square radius which is given by the equation:

$RMSR = (R_1^2 + R_2^2 + R_3^3 + R_4^2)1;2/2 = (R_X^2 + R_Y^2 + t^2/4 + b^2/4)1;2$ and RMSWS is the root mean square wheel speed which is given by the equation $RMSWS = Kd = (\omega_1^2 + \omega_2^2 + \omega_3^2 + \omega_4^2)^{1/2}/2$ where $\omega_1$ and $\phi_1$ are the speed and the clockwise angle of the front right hand wheel respectively $\omega_2$ and $\phi_2$ are the speed and the clockwise angle of the front left hand wheel respectively $\omega_3$ and $\phi_3$ are the speed and the anticlockwise angle of the rear right hand wheel respectively $\omega_4$ and $\phi_4$ are the speed and the anticlockwise angle of the rear left hand wheel respectively R is the radius of curvature of the path of the vehicle $R_X$ is the distance of the centre of curvature of the path of the vehicle to the right of the vehicle centre $R_Y$ is the distance of the centre of curvature of the path of the vehicle toward of the vehicle centre b is the wheel base of the vehicle t is the track of the vehicle $R_1$, $R_2$, $R_3$ and $R_4$ are the distances of the front right hand wheel, the front left hand wheel, the rear right hand wheel and the rear left hand wheel respectively from the centre of curvature of the path of the vehicle d is the displacement of the joy stick, where the centre of curvature of the path of the vehicle is at right angles to the direction of displacement of the joystick $\psi$ is the angle of displacement of the joystick to the left of the straight ahead position K is a suitable constant $\theta$ is the angle of rotation of the joystick and $\theta_{max}$ is the maximum angle of rotation of the joystick.

16. A four wheeled vehicle according to claim 15 where the rotatable joystick is replaced by two joy sticks where the lateral and longitudinal displacement of one joy stick controls the radius of curvature of the path of the vehicle and the root mean square wheel speed respectively, where backwards movement of the joystick reverses the rotation of all wheels, and where the displacement of the second joystick is at right angles to the axis on which the centre of curvature of the path of the vehicle lies.

17. A four wheeled vehicle according to claim 15 where the rotatable joystick is replaced by either a small steering wheel, knob or lever and one joystick, where the rotation of the steering wheel, knob or lever controls the radius of curvature of the path of the vehicle, and the direction of displacement of the joystick is perpendicular to the direction of the centre of curvature of the path of the vehicle and the amount of displacement determines the root mean square wheel speed, where backwards movement of the joystick reverses the rotation of all wheels.

18. A four wheeled vehicle according to claim 15, where $R_Y = 0$ so that the centre of curvature of the path of the vehicle always lies on the transverse axis of the vehicle.

19. A four wheeled vehicle according to claim 16, where $R_Y = 0$ so that the centre of curvature of the path of the vehicle always lies on the transverse axis of the vehicle.

20. A four wheeled vehicle according to claim 17, where $R_Y = 0$ so that the centre of curvature of the path of the vehicle always lies on the transverse axis of the vehicle.

21. A four wheeled vehicle according to claim 15, where $R_Y +/- b/2$ so that the centre of curvature of the path of the vehicle always lies on the axes of the front or rear wheels respectively.

22. A four wheeled vehicle according to claim 16, where $R_Y = +/- b/2$ so that the centre of curvature of the path of the vehicle always lies on the axes of the front or rear wheels respectively.

23. A four wheeled vehicle according to claim 17, where $R_Y = +/- b/2$ so that the centre of curvature of the path of the vehicle always lies on the axes of the front or rear wheels respectively.

24. A six wheeled vehicle made by modifying the vehicle according to claim 15, where $R_Y = -b/2$, and where an extra pair of wheels are added to the rear of the vehicle which are the mirror image of the original front wheels with respect to a transverse vertical plane passing through the centres of the original rear wheels, where the angles of the two new wheels are equal but opposite the angles of the original front wheels, and where the speeds of the two new wheels are equal but not opposite the speeds of the original front wheels.

25. A six wheeled vehicle made by modifying the vehicle according to claim 16, where $R_Y = -b/2$, and where an extra pair of wheels are added to the rear of the vehicle which are the mirror image of the original front wheels with respect to a transverse vertical plane passing through the centres of the original rear wheels, where the angles of the two new wheels are equal but opposite the angles of the original front wheels, and where the speeds of the two new wheels are equal but not opposite the speeds of the original front wheels.

26. A six wheeled vehicle made by modifying the vehicle according to claim 17, where $R_Y = -b/2$, and where an extra pair of wheels are added to the rear of the vehicle which are the mirror image of the original front wheels with respect to a transverse vertical plane passing through the centres of the original rear wheels, where the angles of the two new wheels are equal but opposite the angles of the original front wheels, and where the speeds of the two new wheels are equal but not opposite the speeds of the original front wheels.

27. An eight wheeled vehicle made by modifying the vehicle according to claim 15, where $R_Y = -B$, and where two extra pairs of wheels are added to the rear of the vehicle which are the mirror image of the original four wheels with respect to a transverse vertical plane located B−b/2 behind the line joining the centres of the original rear wheels, where the angles of the four new wheels are equal but opposite the angles of the original four wheels and where the speeds of the four new wheels are equal but not opposite the speeds of the four original wheels, where B can have any value greater than b/2+r, where r is the radius of the wheels.

28. An eight wheeled vehicle made by modifying the vehicle according to claim 16, where, $R_Y = -B$, and where two extra pairs of wheels are added to the rear of the vehicle which are the mirror image of the original four wheels with respect to a transverse vertical plane located B−b/2 behind the line joining the centres of the original rear wheels, where the angles of the four new wheels are equal but opposite the angles of the original four wheels and where the speeds of the four new wheels are equal but not opposite the speeds of the four original wheels, where B can have any value greater than b/2+r, where r is the radius of the wheels.

29. An eight wheeled vehicle made by modifying the vehicle according to claim 17, where, $R_y = -B$, and where two extra pairs of wheels are added to the rear of the vehicle which are the mirror image of the original four wheels with respect to a transverse vertical plane located B−b/2 behind the line joining the centres of the original rear wheels, where the angles of the four new wheels are equal but opposite the angles of the original four wheels and where the speeds of the four new wheels are equal but not opposite the speeds of the four original wheels, where B can have any value greater than b/2+r, where r is the radius of the wheels.

30. A vehicle according to claim 15, where the wheels are turned through angles less than +/−45 degrees and the speed of the drive wheels is controlled by one or more conventional differentials which are connected in parallel to one or more steering differentials where the latter are driven at the correct speeds by computer-controlled hydraulic or electric motors.

31. A vehicle according to claim 16, where the wheels are turned through angles less than +/−45 degrees and the speed of the drive wheels is controlled by one or more conventional differentials which are connected in parallel to one or more steering differentials where the latter are driven at the correct speeds by computer-controlled hydraulic or electric motors.

32. A vehicle according to claim 17, where the wheels are turned through angles less than +/−45 degrees and the speed of the drive wheels is controlled by one or more conventional differentials which are connected in parallel to one or more steering differentials where the latter are driven at the correct speeds by computer-controlled hydraulic or electric motors.

* * * * *